United States Patent
Evling et al.

[11] Patent Number: 5,918,337
[45] Date of Patent: Jul. 6, 1999

[54] FISH HOOK SCREWDRIVER

[75] Inventors: Jens Evling, 42 Ralston Dr., Monterey, Calif. 93949; Isaac Silvas, Tomball, Tex.

[73] Assignee: Jens Evling, Monterey, Calif.

[21] Appl. No.: 08/895,792

[22] Filed: Jul. 17, 1997

[51] Int. Cl.$^6$ ..................................................... B25B 25/00
[52] U.S. Cl. ..................... 7/108; 7/108; 7/165; 140/123; 140/102.5
[58] Field of Search ............................... 7/107, 108, 165; 140/123, 102.5

[56] References Cited

U.S. PATENT DOCUMENTS

| | | | |
|---|---|---|---|
| 1,711,062 | 4/1929 | Purinton | 140/124 |
| 2,256,707 | 9/1941 | Fultz | 7/165 |
| 2,332,656 | 10/1943 | Mirando | 7/165 |
| 3,095,912 | 7/1963 | Sullivan | 140/124 |

*Primary Examiner*—David A. Scherbel
*Assistant Examiner*—Shantese McDonald
*Attorney, Agent, or Firm*—Welsh & Katz, Ltd.; Thomas W. Tolpin

[57] ABSTRACT

A multi-purpose tool comprising a fish hook screwdriver is provided to quickly and accurately trace electrical wires. The user-friendly fish hook screwdriver has a screwdriver blade to move, separate or spread a bundle or harness of wires and has a hook which can conveniently slide along the wire being traced. Advantageously, the hook can also hook, pull and lift the wires being traced, as desired. The hook can be an internal hook which extends into the blade or shank. The hook can also be an external hook which extends outwardly from the blade or shank. The hook can have different configurations and sizes to accommodate different size wires.

14 Claims, 1 Drawing Sheet

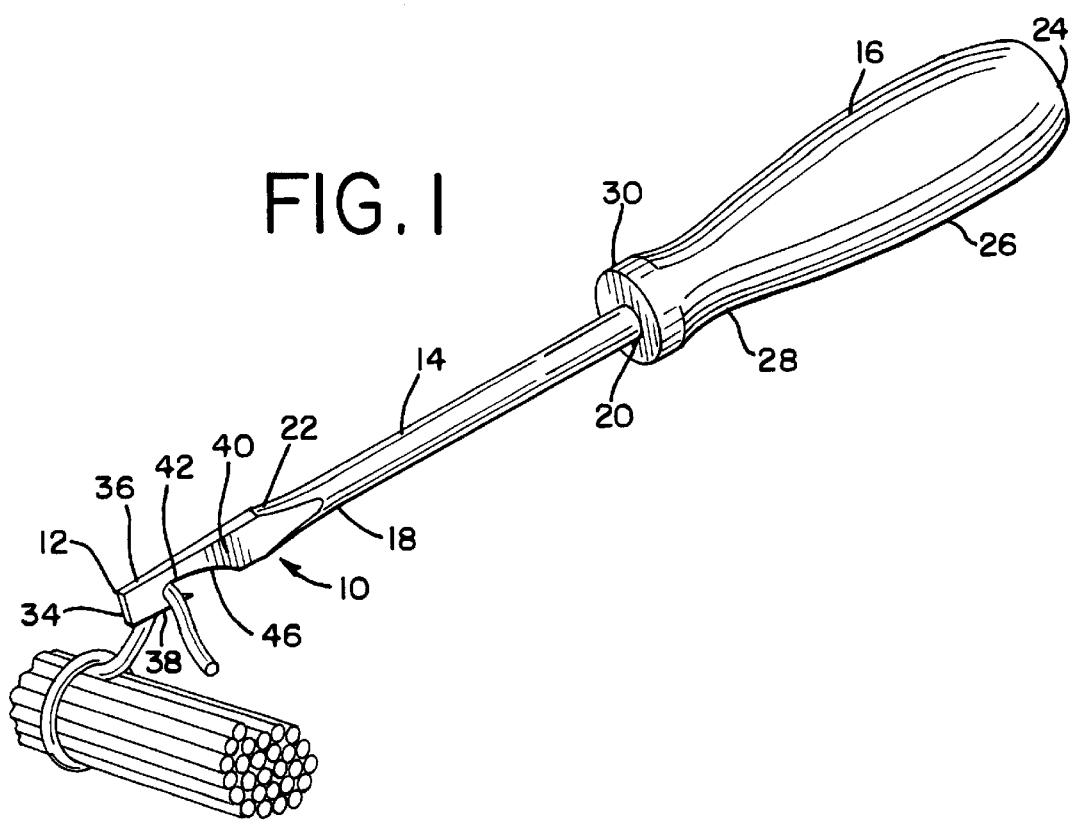
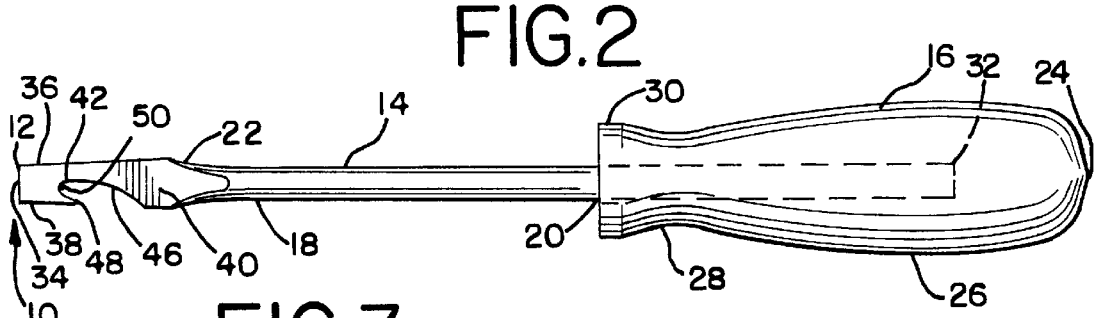
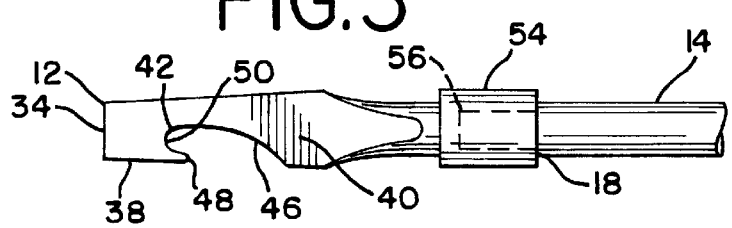
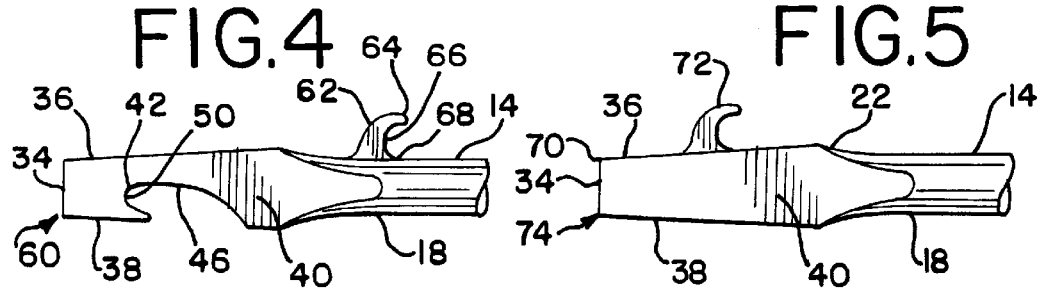

FISH HOOK SCREWDRIVER

BACKGROUND OF THE INVENTION

This invention pertains to tools and, more particularly, to a screwdriver for use by service technicians and electricians. It is important to be able to trace wires, such as electrical wires, cable wires, telephone wires, vehicle wires, airplane wires, computer wires, appliance wires, equipment wires, harnessed wires and other bundled wires. Tracing wires are important when using wiring diagrams or circuit diagrams to identify particular wires and determine where various wires are connected. Tracing wires are also important to identify shorts, shunts, frayed wires, cut wires, damaged wires, loose wires, etc.

Over the years various tools have been used for tracing wires. These conventional tools have met with varying degrees of success. Most conventional tools are awkward, cumbersome, or ineffective and are primarily designed for other purposes. Many electricians, service technicians, auto mechanics, linemen, and repairmen use two or more conventional tools for tracing wires because single tools are not available to effectively trace wires.

Usually, when a technician needs to trace a wire, the technician pulls on the wire to be traced and spreads a wire harness or bundle of wires with a conventional screwdriver. When the technician sees which wire moves, the technician stops pulling on the wire. The technician then gets a needle nose pliers, tries to remember which wire moved, and grabs the wire with the nose of the pliers. This procedure is cumbersome and often ineffective.

It is, therefore, desirable to provide an improved tool which overcomes most, if not all, of the preceding problems.

SUMMARY OF THE INVENTION

An improved multi-purpose tool is provided to readily and easily trace wires, such as electrical wires, cable wires, telephone wires, vehicle wires, airplane wires, computer wires, wires in electrical appliances and equipment, harnessed wires and other bundled wires. Advantageously, the user-friendly tool is reliable, economical and effective. The convenient portable tool is also compact, sturdy, and handy. The multi-purpose tool can be characterized as: an electrician's tool, a service person's tool, a repairman's tool, a lineman's tool, a telephone system installer's tool, a vehicle mechanic's tool, a computer technician's tool, etc.

Desirably, the novel multi-purpose tool has at least one hook to grab a wire and has a blade to move wires. The blade, which is operatively associated with the hook, can be a tapered blade and is preferably a screwdriver blade. In the preferred form, the tool has a shaft connected to the blade and has a handle connected to the shaft. The handle can be molded of impact-resistant plastic or constructed of wood to electrically insulate the blade from the user's hand in order to avoid electrical shocks and injuries. The tool can also have a socket to connect a socket-head blade to the shaft.

The hook can be constructed and arranged to slide along the wire being traced. The hook can be an external hook and can extend laterally outwardly from the blade or shaft. Preferably, the hook is an internal hook which extends inwardly into the blade or shaft and forms a hook-shaped opening. The hook is formed to readily hook, grab and pull a wire without damaging the wire. The hook can have different shapes and sizes to accommodate different diameter wires and materials as well as to accommodate the desires and convenience of the user.

A more detailed explanation of the invention is provided in the following description and claims taken in conjunction with the accompanying drawings.

BRIEF DESCRIPTION OF THE INVENTION

FIG. 1 is a perspective longitudinal side view of a multi-purpose tool comprising a fish hook screwdriver with an internal hook in accordance with principles of the present invention;

FIG. 2 is a longitudinal side view of the fish hook screwdriver of FIG. 1;

FIG. 3 is a fish hook screwdriver socket head in accordance with principles of the present invention;

FIG. 4 is a fragmentary view of a multi-purpose tool comprising a fish hook screwdriver with an internal hook and an external hook in accordance with principles of the present invention; and FIG. 5 is a fragmentary view of a multi-purpose tool comprising a fish hook screwdriver with an external hook in accordance with principles of the present invention.

DETAILED DESCRIPTION OF THE PREFERRED EMBODIMENTS

A multi-purpose fish hook screwdriver 10 (FIGS. 1 and 2) provides a multi-purpose universal tool for electricians, technicians, servicemen, repairmen, linemen, mechanics, etc. to efficiently, accurately and easily trace electrical wires, telephone wires (lines), cable wires and other wires. The fish hook screwdriver has a screwdriver blade 12 to move, separate and spread a bundle, bunch, group or harness of wires and has an elongated shaft 14 comprising a shank. The screwdriver blade and shank are preferably made of metal, iron or steel, or their alloys, but other materials can be used, if desired. The screwdriver also has a manually grippable, electrically insulating handle 16, which is preferably made of impact-resistant plastic or wood.

The shank (shaft) 14 can be rigid or semi-rigid, cylindrical, solid and straight (linear). Preferably, the shank is in coaxial alignment with the screwdriver blade and handle. The shank has a forward blade-connecting section 18 providing a front end of the shank and has a handle-connecting section 20 providing a rearward or back end of the shank. The forward blade-connecting section is securely connected to the rearward connecting portion 22 of the screwdriver blade. In the embodiments of FIGS. 1 and 2, the forward blade-connecting section is integrally connected to the rearward connecting portion of the screwdriver blade. The handle and handle-connecting section of the shank are positioned.

The handle can have an enlarged rounded butt 24 providing a rear end, rounded sloping sides 26, a reduced diameter neck 28, and a collar 30 providing the front end of the handle. The handle also has a hole providing an axial, and preferably a coaxial, socket 32 which extends through the collar into the interior and middle of the handle, along the centerline or longitudinal axis of the handle. The socket snugly receives the handle-connecting portion of the shank so that the handle and handle-connecting portion of the shank can be securely connected to each other. The longitudinal axis of the screwdriver extends through the centerline of the shank and screwdriver blade. The handle, shank and screwdriver blade are preferably in coaxial alignment and registration with each other.

The screwdriver blade can have a substantially planar or flat tip 34 and tapered, slanted or inclined sides 36 and 38 which are positioned at an angle of inclination of 5° to 45°, preferably 10° to 20°, relative to the longitudinal axis (centerline) of the screwdriver blade. The sides 36 and 38 of the blade can diverge away from the blade's tip in a rearward direction rearwardly towards the handle. The sides of the blade can be longer and extend a greater distance than the maximum transverse span and width of the tip of the blade. Preferably, the blade's sides are 1.5 to 4, most preferably 2.5 to 3.5, times longer than the span of the blade's tip. The faces 40 of the screwdriver blade can be beveled and tapered towards the blade's tip.

In the embodiments of FIGS. 1 and 2, the fish hook screwdriver blade 12 has a wire-engaging internal hook 42 to snugly engage, grab, pull, cradle, lift, and/or hold the wire being traced in the bundle, bunch, group or harness of wires. The hook defines a hook-shaped opening 46 that is positioned between the blade's tip and the rearward connecting portion of the screwdriver blade. The hook and hook-shaped open can be J-shaped and can span a lateral distance or width ranging from slightly less than to slightly more than the maximum diameter of the wire being traced and engaged by the hook. Preferably, the maximum lateral span and width of the hook-shaped opening is slightly less than the wire being traced to permit the hook to snugly engage, wedge and hook the wire being traced.

In the illustrative embodiment, the hook and hook-shaped opening extend laterally inwardly from the side 38 of the screwdriver blade to a position in proximity to the longitudinal axis (centerline) of the screwdriver blade. The hook and hook-shaped opening can also extend a longitudinal distance in the longitudinal direction, i.e., in direction along the longitudinal axis, greater than the maximum lateral span or width of the tip of the screwdriver blade. Preferably, the hook and hook-shaped opening extend a longitudinal distance of 1.25 to 3.5, most preferably 1.5 to 2.5, times longer the maximum later span of the blade's tip. The hook can be positioned in proximity to the tip of the screwdriver blade. Desirably, the hook-shaped opening is spaced a sufficient distance away from the blade's tip to prevent the tip from breaking or chipping.

The hook can have a pointed or rounded wire-engaging edge 48 and can have a concave, rearwardly facing, rounded C-shaped, wire-engaging portion 50, which can be integrally connected to and extend forwardly of the edge 48 in a direction towards the tip of the screwdriver blade. The maximum lateral span and width of the hook and hook-shaped opening can range from 0.25 to 0.75, preferably from 0.33 to 0.5, of the maximum lateral span and width of the tip of the screwdriver blade.

The fish hook screwdriver blade 52 of FIG. 3 is structurally and functionally similar to the screwdriver blade of FIGS. 1 and 2 except that it comprises a sockethead or screwdriver blade sockethead. The sockethead has a socket 54 with a female opening which snugly receives and interlockingly engage a plug 56 at the forward blade-connecting section at the front end of the shank. The plug can have a rectangular shape and cross-section with a lateral span and width less than the maximum diameter of the shank. The plug can comprises a rigid extension finger or male locking member that is cantilevered and extends forwardly from the front of the shank to engage the socket. The plug can also have one or more ball bearings to facilitate locking attachment and unlocking detachment of the sockethead from the shank's plug. The edge 48 of the hook can be pointed or rounded as shown.

The multi-purpose fish hook screwdriver 60 of FIG. 4 is structurally and functionally similar to the multi-purpose fish hook screwdriver 10 of FIGS. 1 and 2, except that it also has an external wire-engaging hook 62 which is securely attached to and extends laterally outwardly from the shank (shaft). The external hook can be positioned in proximity to the forward blade-connecting section 18 of the shaft and near side 36 of the screwdriver blade 12. In some circumstances, it may be desirable that the external hook be attached to and extend laterally outwardly of the side 36 of the screwdriver blade opposite the internal hook 42 and internal hook-shaped opening 46.

The external hook 62 (FIG. 4) can span a lateral distance or width slightly less to slightly more than the maximum diameter of the wire being traced. Preferably, the maximum lateral span and width of the external hook is slightly less than the wire being traced to permit the external hook to snugly engage, wedge and hook the wire being traced. The external hook can have a cantilevered pointed or rounded wire-engaging edge 64 and can have a concave, rearwardly facing, rounded C-shaped wire-engaging portion 66, which extends forwardly of the external hook's edge 64. The external hook also has a connecting portion 68 which is welded or otherwise securely connected to the shank. The external hook can be J-shaped. Desirably, the internal hook 42 and the external hook 62 can be different sizes and widths to accommodate different size wires.

The fish hook screwdriver blade 70 of FIG. 5 is structurally and functionally similar to the screwdriver blade 12 of FIG. 4, except that the external wire-engaging hook 72 is securely welded or otherwise connected to the side 36 of the screwdriver blade. The external hook 72 of the multi-purpose fish hook screwdriver 74 of FIG. 5 can be similar in size, shape and function to the external hook 62 of FIG. 4. The screwdriver blade of FIG. 5 may not have an internal hook.

Among the many advantages of the multi-purpose tools and fish hook screwdrivers of the invention are:

1. Outstanding performance and ability to trace wires.
2. Superb capability to grasp, pull and lift a wire being traced.
3. Excellent ability to isolate, identify, hold and separate a wire from a bundle, bunch, group or harness of wires.
4. A superior multi-purpose tool for tradesmen, repairmen, technicians, linemen, and electricians.
5. Easy to use.
6. Convenient.
7. Dependable
8. User-friendly
9. Time saver.
10. Accurate
11. Efficient
12. Effective Although embodiments of the invention have been shown and described, it is to be understood that various modifications and substitutions of parts, components, procedures and process steps, may be made by those skilled in the art without departing from the novel spirit and scope of this invention.

What is claimed is:

1. A multi-purpose tool, comprising:
   at least one wire-engaging hook defining a hook-shaped opening for grabbing a wire;
   a blade operatively associated with said wire-engaging hook for moving wires, said blade having a tip with a maximum lateral span;

said wire-engaging hook being spaced entirely rearwardly of the tip of said blade;

said wire-engaging hook comprising a concave rearwardly-facing wire-engaging portion facing rearwardly and away from the tip of said blade;

a shaft connected to said blade and a handle connected to said shaft; and wherein said wire-engaging hook extends rearwardly and outwardly from said blade or shaft.

2. A multi-purpose tool in accordance with claim 1 wherein said blade is a screwdriver blade.

3. A multi-purpose tool in accordance with claim 1 including a socket connecting said blade to said shaft.

4. A multi-purpose tool in accordance with claim 1 wherein said hook is an internal wire-engaging hook; and said internal wire-engaging hook and said hook-shaped opening have a maximum lateral span ranging from about 0.25 to about 0.75 of the maximum lateral span of the tip of said blade.

5. A multi-purpose tool in accordance with claim 4 wherein:

the maximum lateral span of said internal wire-engaging hook and said hooked-shaped opening ranges from 0.33 to 0.5 of the maximum lateral span of the tip of said blade;

said wires are selected from the group consisting of: electrical wires, telephone wires, computer wires, automobile wires, vehicle wires, airplane wires, appliances, equipment wires, and cables; and said tool is selected from the group consisting of: an electrician's tool, a service person's tool, a computer technician's tool, a lineman's tool, a telephone repairman's tool, a telephone system installer's tool, and a vehicle mechanic's tool.

6. A multi-purpose tool in accordance with claim 1 wherein said hook is an external wire-engaging hook.

7. A multi-purpose screwdriver, comprising:

a screwdriver blade for moving and spreading a bundle or harness of wires selected from the group consisting of electrical wires, telephone wires, vehicle wires, airplane wires, appliances wires, equipment wires, and cables, said screwdriver blade having a substantial planar tip and tapered sides, said tapered sides positioned at an angle of inclination from about 5° to about 45° relative to a longitudinal axis and diverging away from said tip, said screwdriver blade having a rearward connecting portion, said rearward connecting portion having a greater lateral span than said tip, and said sides extending a greater longitudinal distance than the maximum span of said tip;

an elongated shaft comprising a shank positioned in coaxial alignment with said screwdriver blade, said shank having a blade connecting section connected to said rearward connecting portion of said screwdriver blade and having a handle-connecting section at its rearward end disposed longitudinally opposite of said blade;

a manually grippable electrically insulating handle positioned in coaxial alignment with said shank, said electrically insulating handle defining an axial socket along said longitudinal axis for snugly receiving said handle-connecting section of said shank, and said handle securely connected to said handle-connecting section of said shank; and at least one wire-engaging hook defining a hook-shaped opening for grabbing a wire, and said wire-engaging hook extends rearwardly and outwardly from said blade or shaft.

8. A multi-purpose screwdriver in accordance with claim 7 wherein said wire-engaging hook comprises an external wire-engaging hook positioned rearwardly of the tip of the screwdriver blade, and said external wire-engaging hook comprising a concave rearwardly facing wire-engaging portion facing rearwardly and away from the tip of said screwdriver blade.

9. A multi-purpose screwdriver in accordance with claim 7 wherein said wire-engaging hook comprises an internal wire-engaging hook, and said internal wire-engaging hook extends a longitudinal distance from about 1.25 to about 3.5 times longer than the maximum span of said tip.

10. A multi-purpose screwdriver in accordance with claim 7 wherein said hook has a wire-engaging edge selected from the group consisting of a pointed edge and a rounded edge.

11. A multi-purpose screwdriver in accordance with claim 7 wherein:

said hook-shaped opening is substantially J-shaped;

said shaft comprises a solid metal shaft; and said handle is selected from the group consisting of a plastic handle and a wooden handle.

12. A multi-purpose screwdriver in accordance with claim 7 wherein said wire-engaging hook is spaced from said tip a sufficient distance to substantially prevent said tip from breaking.

13. A multi-purpose screwdriver in accordance with claim 7 wherein the maximum lateral span of said hooked-shaped opening is less than the maximum diameter of said wire for permitting said wire-engaging hook to wedgingly hook and snugly engage said wire.

14. A multi-purpose screwdriver in accordance with claim 7 wherein the maximum lateral span of said hook-shaped opening of said wire-engaging hook ranges from about 0.25 to 0.75 of the maximum span of the tip of said screwdriver blade.

* * * * *